(12) United States Patent
Townson et al.

(10) Patent No.: US 7,481,479 B1
(45) Date of Patent: Jan. 27, 2009

(54) DUAL ACTION HINGE AND STRIKER FOR A MOTOR VEHICLE ENDGATE

(75) Inventors: James M. Townson, Clarkston, MI (US); Michael K. Zelek, Canton, MI (US); Leonard J. Brohl, Jr., Ortonville, MI (US); Tanya J. Klain, Novi, MI (US); John B. Morley, Troy, MI (US); Sarah Pearson, Novi, MI (US); Patrick O. McGee, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/099,185

(22) Filed: Apr. 8, 2008

(51) Int. Cl.
*B62D 33/03* (2006.01)

(52) U.S. Cl. .................. 296/51; 296/57.1; 296/146.12; 292/DIG. 29; 49/192; 16/367; 16/223; 16/231; 16/321

(58) Field of Classification Search .................. 296/50, 296/51, 57.1, 146.8, 146.12; 292/210, 216, 292/DIG. 29, 285; 49/192; 16/367, 307, 16/223, 231, 297, 321
See application file for complete search history.

(56) References Cited

U.S. PATENT DOCUMENTS

| | | | | |
|---|---|---|---|---|
| 3,387,406 A | * | 6/1968 | Coker et al. ................... | 49/192 |
| 3,454,299 A | * | 7/1969 | Hewitt et al. .................. | 296/50 |
| 3,567,274 A | * | 3/1971 | Kaptur, Jr. et al. ............ | 296/50 |
| 3,592,504 A | * | 7/1971 | Sandor ......................... | 296/70 |
| 3,623,764 A | * | 11/1971 | Jacobus ....................... | 296/50 |
| 4,063,330 A | * | 12/1977 | Triplette ...................... | 16/321 |
| 4,076,301 A | * | 2/1978 | Gergoe ........................ | 296/50 |
| 4,823,437 A | * | 4/1989 | Tatara ......................... | 16/300 |
| 4,823,438 A | * | 4/1989 | Roloff ......................... | 16/307 |
| 6,676,196 B1 | * | 1/2004 | Smith ......................... | 296/146.8 |
| 6,942,268 B2 | * | 9/2005 | Vejnar ........................ | 296/26.11 |
| 7,007,346 B2 | * | 3/2006 | Hoffman ...................... | 16/367 |
| 7,080,868 B2 | * | 7/2006 | McClure et al. ............... | 296/50 |
| 7,093,876 B2 | * | 8/2006 | Romig et al. ................. | 296/50 |
| 7,118,153 B2 | * | 10/2006 | Kitayama et al. ............. | 296/57.1 |
| 7,147,257 B2 | * | 12/2006 | Johansen et al. .............. | 292/341.15 |
| 7,150,486 B2 | * | 12/2006 | Ichinose ...................... | 296/51 |
| 7,165,800 B2 | * | 1/2007 | Thiele et al. .................. | 296/50 |
| 7,201,422 B2 | * | 4/2007 | Plett et al. .................... | 296/51 |
| 7,201,423 B2 | * | 4/2007 | Ichinose ...................... | 296/51 |
| 7,243,973 B2 | * | 7/2007 | Plett et al. .................... | 296/57.1 |
| 7,258,373 B2 | * | 8/2007 | Plett et al. .................... | 292/210 |
| 2003/0122396 A1 | * | 7/2003 | Humphrey et al. ............ | 296/51 |
| 2005/0035620 A1 | * | 2/2005 | Ichinose ...................... | 296/51 |

(Continued)

*Primary Examiner*—Jason S Morrow (57) ABSTRACT

An assembly for opening and closing a passageway into a motor vehicle includes a post secured to the body at a lateral side of the passageway, an endgate for opening and closing the passageway, a hinge-striker that includes a first plate secured to the post and including mutually spaced first lugs, with each first lug being formed with a hole; a second plate including mutually spaced second lugs, with each second lug being formed with a hole, the holes of the first plate being aligned with the holes of the second plate; a hinge pin located in the holes and aligned with an upright axis; and a striker, secured to and extending from one of said plates, and a latch secured to the post for releasably engaging the hinge-striker, where the engagement secures the endgate in a position that closes the passageway and prevents pivoting about a lateral axis.

16 Claims, 6 Drawing Sheets

U.S. PATENT DOCUMENTS

| | | | |
|---|---|---|---|
| 2005/0057063 A1* | 3/2005 | Thiele et al. | 296/50 |
| 2006/0006680 A1* | 1/2006 | Johansen et al. | 292/340 |
| 2006/0249971 A1* | 11/2006 | Ichinose | 296/51 |
| 2007/0296226 A1* | 12/2007 | Gruber et al. | 292/216 |

\* cited by examiner

DUAL ACTION HINGE AND STRIKER FOR A MOTOR VEHICLE ENDGATE

BACKGROUND OF INVENTION

This invention relates generally to an endgate for a motor vehicle, and, more particularly, to an endgate and hinge assembly that allows the endgate to swing alternately about a lateral axis and an upright axis.

The tailgate at the back of a wagon, truck, station wagon, etc. is usually hinged along a lateral axis at the bottom of the tailgate to pivot downward for convenience in loading or unloading cargo. A door at the back of a vehicle hinged along a lateral axis at the top to open upward is often referred to as a hatch or lift gate.

In certain cases, it is helpful and preferred that the vehicle have an endgate that can swing like a door about a vertical axis to facilitate access to the cargo area.

A more recent need exists in the automotive industry for a hinge assembly that supports an endgate such that the gate can swing both upward and downward about a horizontal axis and like a door about a vertical axis at the option of the user.

SUMMARY OF INVENTION

An assembly for opening and closing a passageway into the body of a motor vehicle includes a post secured to the body at a lateral side of the passageway, an endgate for opening and closing the passageway, a hinge-striker that includes a first plate secured to the post and including mutually spaced first lugs, each first lug being formed with a hole; a second plate including mutually spaced second lugs, each second lug being formed with a hole, with the holes of the first plate being aligned with the holes of the second plate; a hinge pin located in the holes and aligned with an upright axis; and a striker, secured to and extending from one of said plates, and a latch secured to the post for releasably engaging the hinge-striker.

The hinge/striker provides in a singe component a dual function accomplished by a hinge pin that guides pivoting of the endgate about an axis and a striker surface that can be engaged by a latch, which secures the endgate in a position that closes the passageway and prevents pivoting of the endgate about another axis.

By combining the dual functions of the hinge/striker in a single component, the number of parts required to support and latch the endgate is reduced, weight and low cost are minimized, and mechanical attachment operations are eliminated.

DETAILED DESCRIPTION

Figure 1:
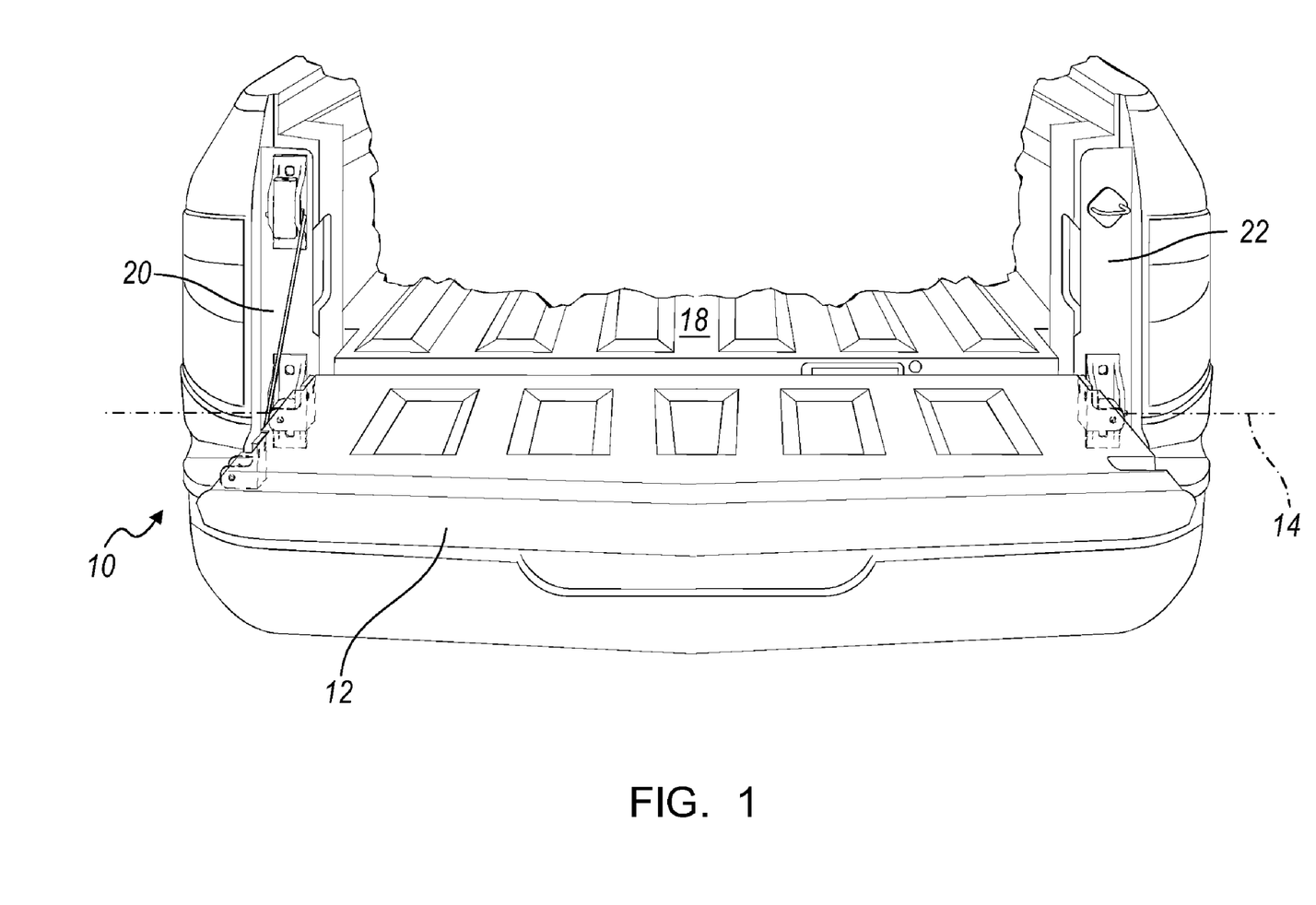
FIG. 1 is a rear view of a pickup truck showing the endgate opened about a lateral axis.
Figure 2:
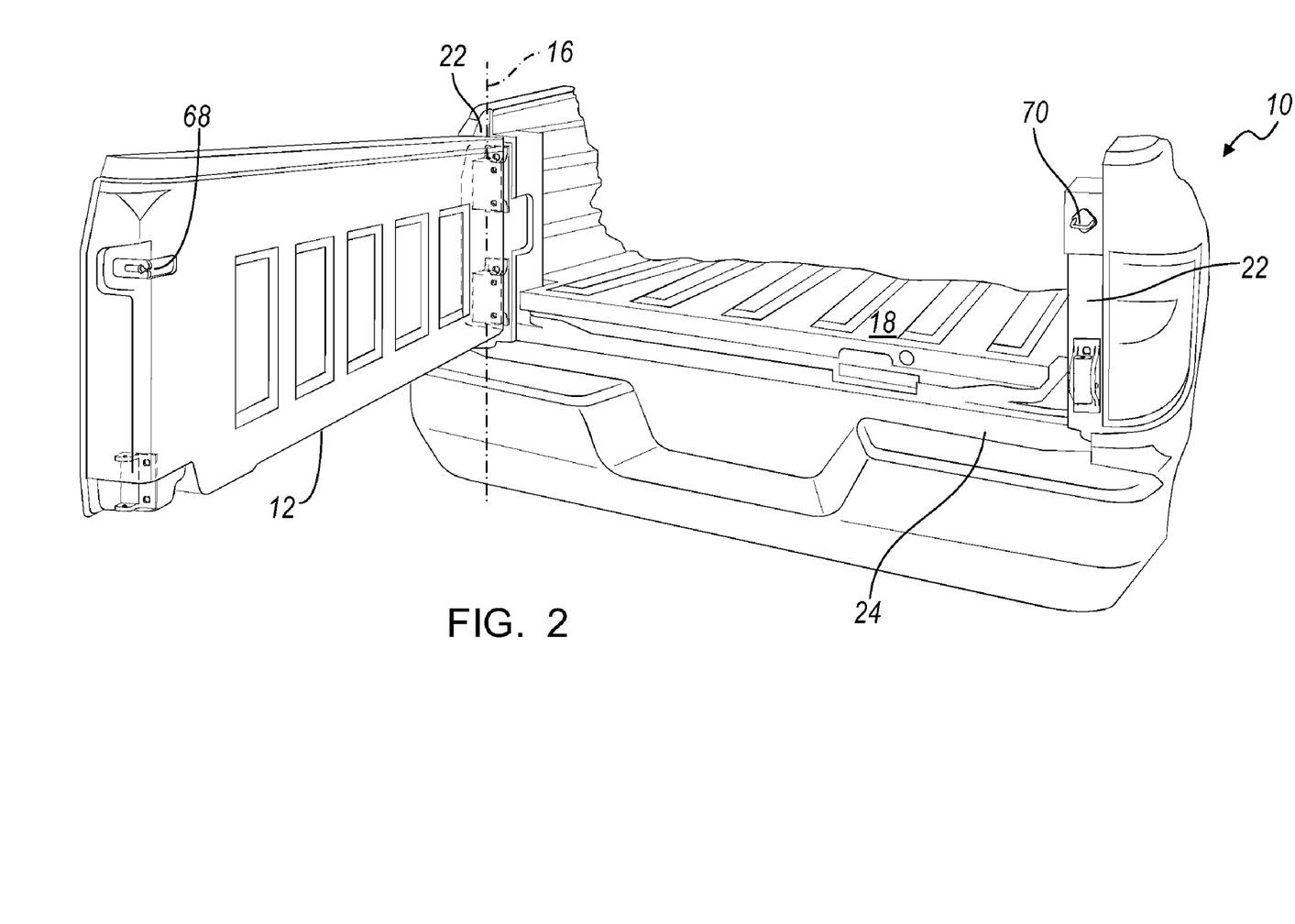
FIG. 2 is a rear view of the pickup truck showing the endgate opened about an upright axis.

Referring now to the drawings, there is illustrated in FIGS. 1 and 2 a pickup truck 10 whose endgate 12 is hinged both about a lateral axis 14 and an upright axis 16 for opening and closing access to the truck bed 18. The cargo opening is formed with a left-side post 20, a right-side post 22, and a rail interconnecting the posts 20, 22. Preferably, axis 14 is horizontal and axis 16 is vertical, although those axes may be skewed with respect to the horizontal and vertical planes.

Figure 3:
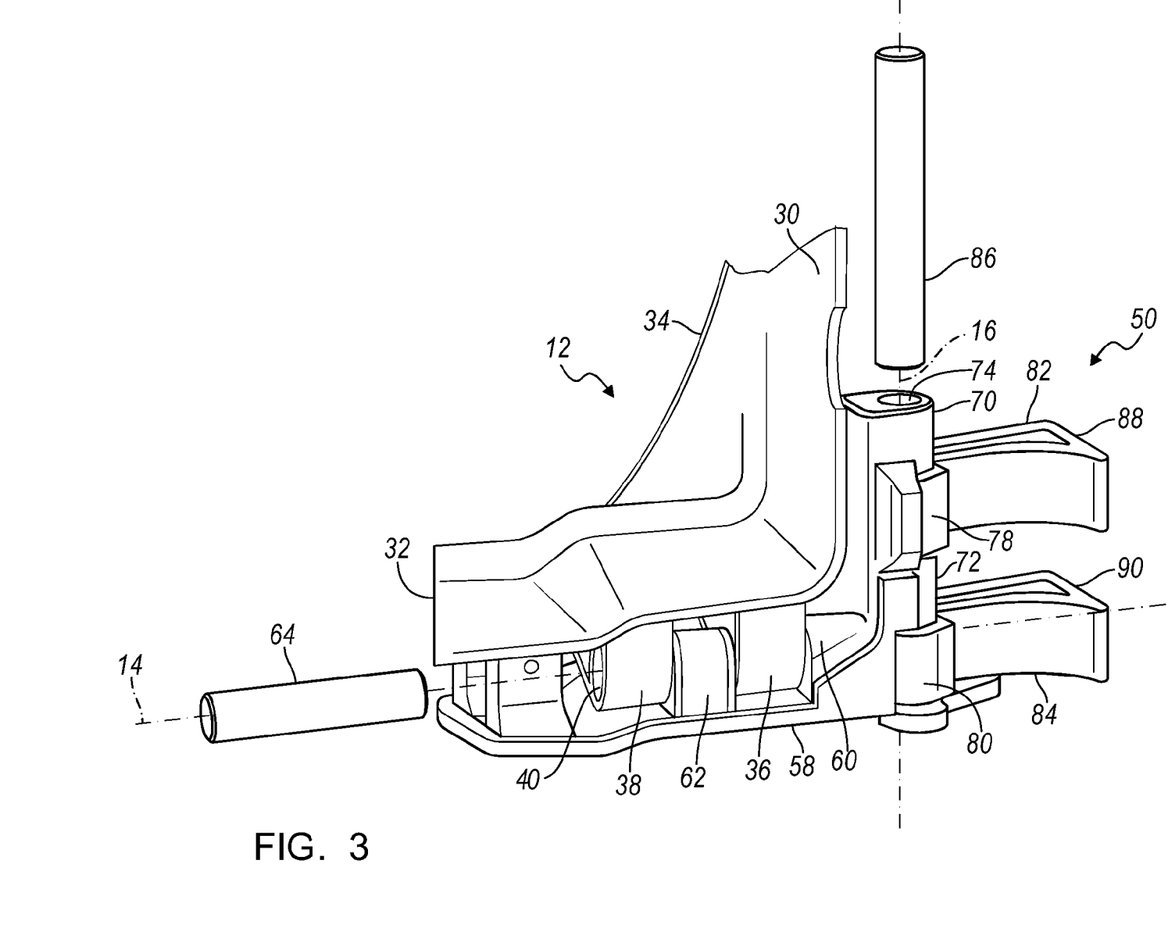
FIG. 3 is a perspective view of a portion of a dual action hinge secured to the endgate.
Figure 4:
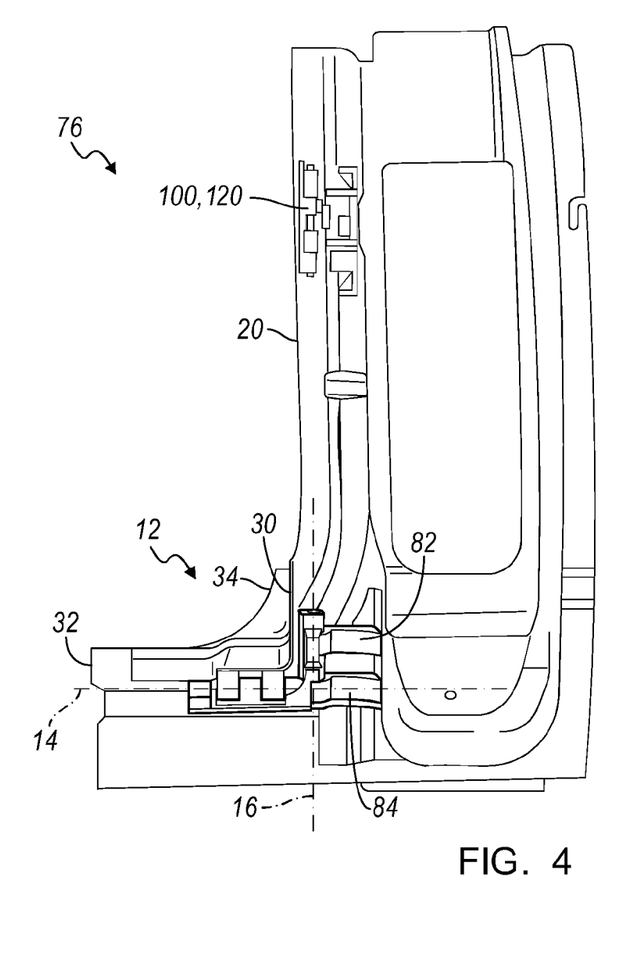
FIG. 4 is an end view looking forward and showing the right-side, rear quarter panel, in which the dual action hinge assembly of FIG. 3 is installed.

As shown in FIGS. 3 and 4, the endgate 12 is formed with a side leg 30, a lateral leg 32 and an end panel 34 secured to the legs 30, 32. The lower surface of the lower leg 32 is secured to two mutually spaced lugs 36, 38, each lug being formed with a laterally-directed circular cylindrical hole 40. Each hole 40 is aligned mutually and installed in the vehicle in alignment with lateral axis 14. The lugs 36, 38 may be formed integrally with the lower leg 32 or connected to the lower leg by mechanical fasteners, welding or bonding.

An endgate hinge 50 includes a lower plate 58, which extends laterally and is formed with two mutually spaced lugs 60, 62, each lug being formed with a laterally-directed circular cylindrical hole. The holes in lugs 60, 62 of hinge 50 are aligned mutually and are aligned with the holes 40 in lugs 38, 40 of the endgate 12. A hinge pin 64 is installed in the holes of the endgate lugs 36, 38 and the holes of the endgate hinge lugs 60, 62. The endgate hinge 50 is installed in the vehicle 10 such that the aligned holes of lugs 36, 38, 60, 62 are aligned also with lateral axis 14.

The endgate hinge 50 is formed with two mutually spaced lugs 70, 72, each lug being formed with a laterally-directed circular cylindrical hole 74 and secured to lower plate 58. The holes in lugs 70, 72 are aligned mutually and are aligned also with holes in lugs 78, 80, which are formed in upper and lower arms 82, 84. A second hinge pin 86 is installed in the holes of lugs 70, 72, 78, 80. The endgate hinge 50 is installed in the vehicle 10 such that the aligned holes of lugs 70, 72, 78, 80 are aligned with upright axis 16. Arms 82, 84 are formed to provide clearance with the endgate 12 as it pivots about the upright axis 16. The endgate 12, therefore, can pivot 90 degrees between its opened and closed positions.

The outer end 88 of arm 66 and the outer end 90 of arm 84 are secured to the right-side post 22, preferably by mechanical fasteners. Lugs 70, 72, lower plate 58 and lugs 60, 62 of hinge 50, and the lugs 36, 38 of endgate 12 pivot about axis 16 at pin 86 relative to the arms 66, 68 and post 20.

Figure 5:
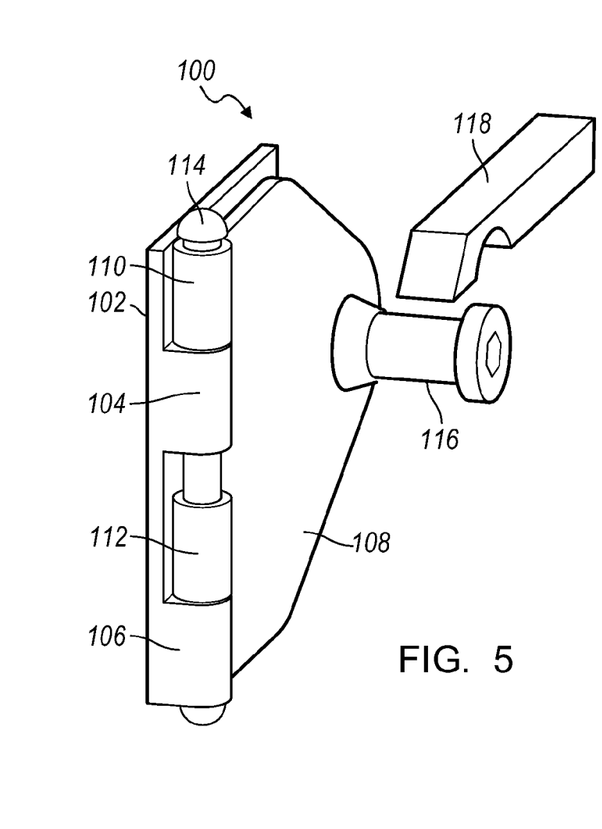
FIG. 5 is a perspective view of a dual action hinge/striker.

FIG. 5 illustrates an upper hinge/striker 100 that includes a gate-side strap or plate 102, which is secured preferably by mechanical fasteners to the side leg 30 of tailgate 12 and is formed with spaced lugs 104, 106. Hinge/striker 100 further includes a body-side strap or plate 108, which is formed with spaced lugs 110, 112 that alternate with the lugs of gate-side strap 108. Each of lugs 104, 106, 110, 112 is formed with a pin hole, into which is fitted a hinge pin 114. Hinge/striker 100 is installed in the vehicle at a higher elevation than dual action hinge 50 such that hinge pin 114 is aligned with axis 16 and pin 86. The outboard surface of plate 108 supports a striker 116, which extends laterally toward post 22. A latch 118, secured to post 22, resiliently and releasably engages striker 116 with an elastic force. When latch 118 and striker 100 are engaged, endgate 12 is in its closed position and their engagement secures the endgate against pivoting.

Figure 6:
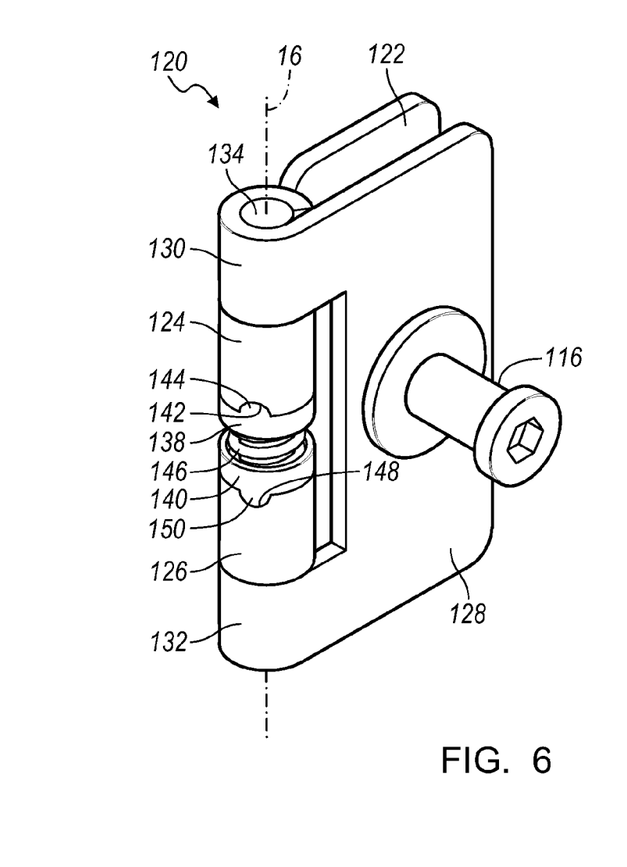
FIG. 6 is a perspective view of alternative dual action hinge/striker in its closed position.
Figure 7:
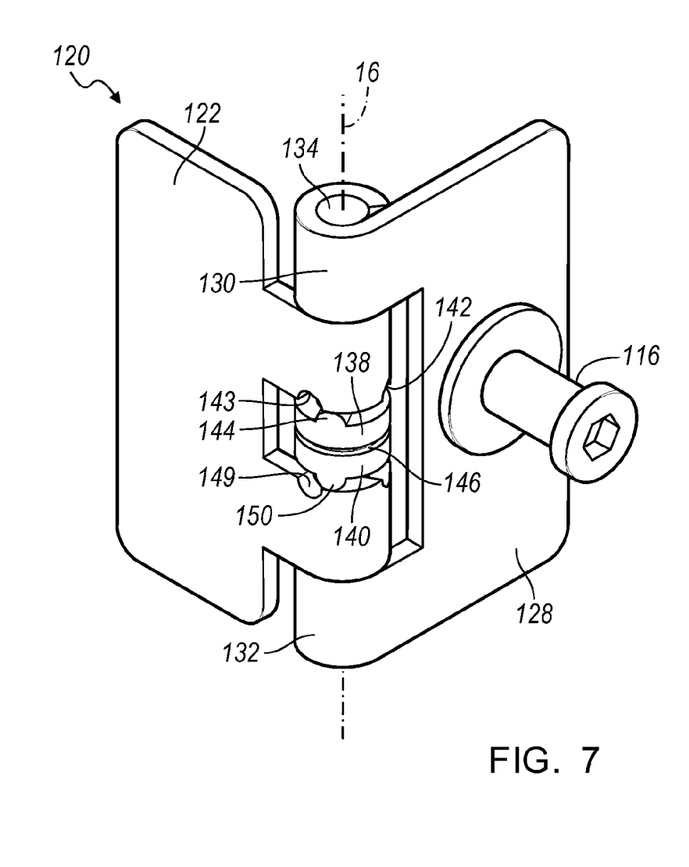
FIG. 7 is a perspective view of the dual action hinge/striker of FIG. 6 in the open position.
Figure 8:
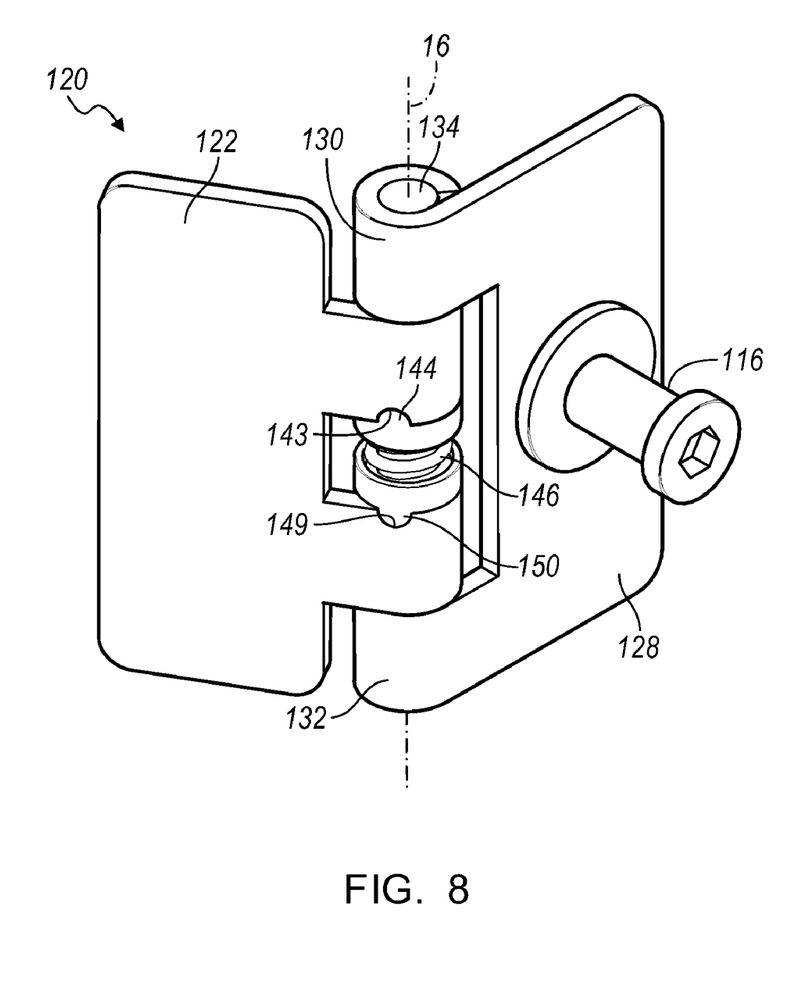
FIG. 8 is a perspective view of the dual action hinge/striker of FIG. 6 in the fully open position.

FIGS. 6, 7 and 8 illustrate a second embodiment of an upper hinge/striker 120. Upper hinge/striker 120 includes a gate-side strap or plate 122, which is secured preferably by mechanical fasteners to the side leg 30 of tailgate 12 and is formed with spaced lugs 124, 126. Hinge/striker 120 further includes a body-side strap or plate 128, which is formed with spaced lugs 130, 132. Each lug 124, 126, 130, 132 is formed with a pin hole, into which is fitted a hinge pin 134. Hinge/striker 120 is installed in the vehicle at a higher elevation than dual action hinge 50 such that hinge pin 134 is aligned with axis 16 and pin 86. The outboard surface of plate 108 supports striker 116, which extends laterally toward post 22. Latch 118, secured to post 22, resiliently and releasably engages striker 116 with an elastic force. When latch 118 and striker 100 are engaged, endgate 12 is in its closed position and their engagement secures the endgate against pivoting.

An upper detent disc 138 and lower detent disc 140 are located between lugs 124, 126 and are each formed with a hole, through which hinge pin 134 passes. The lower surface of lug 124 is formed with multiple recesses 142, 143 spaced angularly about the axis of hinge pin 134. The upper surface of disc 138 is formed with a projection 144, which is continually biased toward lug 124 by a compression spring 146, located between discs 138, 140. Similarly, the upper surface of lug 126 is formed with multiple recesses 148, 149 spaced angularly about the axis of hinge pin 134. The lower surface of disc 140 is formed with a projection 150, which is continually biased toward lug 126 by compression spring 146.

FIG. 7 shows the hinge/striker 120 having pivoted 90 degrees about axis 16 from the closed position of FIG. 6 to a partially open position. Projection 144 is disengaged from recess 142 and contacts the lower surfaces of disc 138 due to the force of spring 146. Projection 150 is disengaged from recess 148 and contacts the lower surfaces of disc 140.

FIG. 8 shows the hinge and striker 120 having pivoted about axis 16 from the closed position of FIG. 6 to a fully open position. Projection 144 is engaged with recess 143 and projection 150 is engaged with recess 149.

When hinge/striker 120 is in the position shown in FIG. 8, endgate 12 is fully open and the engagement of projections 138, 150 with recesses 143, 149, respectively, resists pivoting of the endgate about axis 16. The detent will release the endgate 12 allowing it to pivot about axis 16 toward the closed position upon application of a force of sufficient magnitude tending to close the endgate.

In operation, when a rearward force is applied to endgate 12, the endgate swings about lateral axis 14 to the open position shown in FIG. 1 due to its being supported on posts 20, 22 by dual action endgate hinges 50 located near the bottom of the posts. When a pivoting force is applied to endgate 12, the endgate swings about upright axis 16 to the open position shown in FIG. 2.

Although the term "endgate" has been used in this description, the invention is applicable also to a tailgate hinged at the top to open downward, to a lift gate or hatch hinged at the top to open upward, and to a door hinged at the side for convenience in loading or unloading cargo.

While certain embodiments of the present invention have been described in detail, those familiar with the art to which this invention relates will recognize various alternative designs and embodiments for practicing the invention as defined by the following claims.

What is claimed is:

1. An assembly for opening and closing a passageway into the body of a vehicle comprising:
   a post secured to the body at a lateral side of the passageway;
   an endgate for opening and closing the passageway;
   a hinge-striker that includes a first plate secured to the post and including mutually spaced first lugs, each first lug being formed with a hole; a second plate including mutually spaced second lugs, each second lug being formed with a hole, the holes of the first plate being aligned with the holes of the second plate; a hinge pin located in the holes and aligned with an upright axis; and a striker, secured to and extending from one of said plates; and
   a latch secured to the post for releasably engaging the hinge-striker, said engagement securing the endgate in a position that closes the passageway.

2. The assembly of claim 1 wherein the hinge-striker includes a detent mechanism that resists pivoting of the endgate about the upright axis from the position that closes the passageway.

3. The assembly of claim 1 wherein the hinge-striker includes a detent mechanism that resists pivoting of the endgate about the upright axis from a position that opens the passageway.

4. The assembly of claim 1 wherein the hinge-striker includes:
   a disc including a projection directed toward one of the first lugs, said one of the first lugs being formed with a recess sized to engage the projection as the first plate pivots about the upright axis; and
   a spring for urging the first disc toward engagement with the first recess.

5. The assembly of claim 4 wherein:
   the first disc is formed with a second recess spaced angularly about an axis of the hinge pin from the first recess and sized to engage the projection as the first plate pivots about the upright axis; and
   the spring urges the projection toward engagement with the first recess and the second recess.

6. The assembly of claim 1 wherein the hinge-striker includes:
   a first disc including a first projection directed toward one of the first lugs, said one of the first lugs being formed with a first recess facing the first projection and sized to engage the first projection as the first plate pivots about the upright axis;
   a second disc including a second projection directed toward another of the first lugs, said another of the first lugs being formed with a second recess facing the second projection and sized to engage the second projection as the first plate pivots about the upright axis; and
   a spring located between the first disc and the second disc for urging the first projection toward engagement with the first recess and the second projection toward engagement with the second recess.

7. The assembly of claim 6 wherein:
   the first disc is formed with a third recess spaced angularly about an axis of the hinge pin from the first recess and sized to engage the first projection as the first plate pivots about the upright axis;
   the second disc is formed with a fourth recess spaced angularly about an axis of the hinge pin from the first recess and sized to receive the second projection as the first plate pivots about the upright axis; and
   the spring urges the first projection toward engagement with the first recess and the third recess, and the spring urges the second projection toward engagement with the second recess and the fourth recess.

8. The assembly of claim 1 further comprising:
   a dual action hinge secured to the endgate and the post, including a second hinge pin aligned with the lateral axis and supporting the endgate for pivoting about the lateral axis relative to the post, and a third hinge pin aligned with the upright axis and supporting the endgate for pivoting about the upright axis at a lateral side of the passageway relative to the post.

9. A hinge and latch assembly for supporting an endgate that opens and closes a passageway into the body of a vehicle comprising:
   a hinge-striker that includes a first plate secured to the body and including mutually spaced first lugs, each first lug being formed with a hole; a second plate including mutually spaced second lugs, each second lug being formed with a hole, the holes of the first plate being aligned with the holes of the second plate; a hinge pin located in the holes and aligned with an upright axis; and a striker, secured to and extending from one of said plates; and
   a latch secured to the body for releasably engaging the hinge-striker, said engagement securing the endgate in a position that closes the passageway.

10. The assembly of claim 9 wherein the hinge-striker includes a detent mechanism that resists pivoting of the endgate about the upright axis from the position that closes the passageway.

11. The assembly of claim 9 wherein the hinge-striker includes a detent mechanism that resists pivoting of the endgate about the upright axis from a position that opens the passageway.

12. The assembly of claim 9 wherein the hinge-striker includes:
   a disc including a projection directed toward one of the first lugs, said one of the first lugs being formed with a recess sized to engage the projection as the first plate pivots about the upright axis; and
   a spring for urging the first disc toward engagement with the first recess.

13. The assembly of claim 12 wherein:
   the first disc is formed with a second recess spaced angularly about an axis of the hinge pin from the first recess and sized to engage the projection as the first plate pivots about the upright axis; and
   the spring urges the projection toward engagement with the first recess and the second recess.

14. The assembly of claim 9 wherein the hinge-striker includes:
   a first disc including a first projection directed toward one of the first lugs, said one of the first lugs being formed with a first recess facing the first projection and sized to engage the first projection as the first plate pivots about the upright axis;
   a second disc including a second projection directed toward another of the first lugs, said another of the first lugs being formed with a second recess facing the second projection and sized to engage the second projection as the first plate pivots about the upright axis; and
   a spring located between the first disc and the second disc for urging the first projection toward engagement with the first recess and the second projection toward engagement with the second recess.

15. The assembly of claim 14 wherein:
   the first disc is formed with a third recess spaced angularly about an axis of the hinge pin from the first recess and sized to engage the first projection as the first plate pivots about the upright axis;
   the second disc is formed with a fourth recess spaced angularly about an axis of the hinge pin from the first recess and sized to receive the second projection as the first plate pivots about the upright axis; and
   the spring urges the first projection toward engagement with the first recess and the third recess, and the spring urges the second projection toward engagement with the second recess and the fourth recess.

16. The assembly of claim 9 further comprising:
   a dual action hinge secured to the endgate and the body, including a second hinge pin aligned with the lateral axis and supporting the endgate for pivoting about the lateral axis relative to the body, and a third hinge pin aligned with the upright axis and supporting the endgate for pivoting about the upright axis at a lateral side of the passageway relative to the body.

* * * * *